United States Patent
Cunningham

(10) Patent No.: US 6,584,950 B1
(45) Date of Patent: Jul. 1, 2003

(54) OIL PAN

(75) Inventor: Robert R. Cunningham, Clawson, MI (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/157,295

(22) Filed: May 29, 2002

(51) Int. Cl.$^7$ ................................................. F02F 7/00
(52) U.S. Cl. ................................................. 123/195 C
(58) Field of Search ....................... 123/195 C; 184/106

(56) References Cited

U.S. PATENT DOCUMENTS

| | | | |
|---|---|---|---|
| 4,423,707 A | 1/1984 | Sihon et al. | 123/196 R |
| 4,625,581 A | 12/1986 | Hull | 74/606 R |
| 4,898,261 A | 2/1990 | Winberg et al. | 184/6.22 |
| 4,930,469 A | 6/1990 | Kamprath et al. | 123/195 C |
| 4,938,314 A | 7/1990 | Sitzler et al. | 184/1.5 |
| 5,083,537 A | 1/1992 | Onofrio et al. | 123/175 R |
| 5,190,803 A | 3/1993 | Goldbach et al. | 428/138 |
| 5,375,569 A | * 12/1994 | Santella | 123/90.38 |
| 5,842,265 A | 12/1998 | Rink | 29/460 |
| 5,940,949 A | 8/1999 | Rink | 29/33 K |
| 6,131,543 A | 10/2000 | Achenbach et al. | 123/195 C |

FOREIGN PATENT DOCUMENTS

| | | |
|---|---|---|
| EP | 0 811 761 | 12/1997 |
| WO | 01/83954 | 11/2001 |

OTHER PUBLICATIONS

Automotive Engineering, Jan. 1980, vol. 88, No. 1, p. 96, "Plastic oil pan".

* cited by examiner

*Primary Examiner*—Noah P. Kamen
(74) *Attorney, Agent, or Firm*—Joseph C. Gil; James R. Franks

(57) ABSTRACT

An oil pan which includes a shell of plastic material (e.g., of thermoplastic polyamide), and a support structure (e.g., of metal), having a plurality of perforations, that is fixedly attached to the exterior surfaces and/or the interior surfaces of the plastic shell, is described. More particularly, the oil pan (2) comprises: (a) a shell (11) of plastic material having interior and exterior surfaces, the interior surfaces of the shell defining a hollow interior (40); and (b) a support structure (12) in abutting relationship with and being fixedly attached to at least one of, (i) at least a portion of the exterior surfaces of the shell (11), and (ii) at least a portion of the interior surfaces of the shell (11), the support structure (12) has a plurality of perforations (20) having edges. The plastic shell (11) is formed by molding of plastic material onto the support structure (12), a portion of the plastic material of the shell (11) extends through at least some of the perforations (20) of the support structure (12), the edges of the perforations (20) being embedded in the plastic material extending there through, thereby attaching fixedly the support structure (12) to the plastic shell (11). The oil pan of the present invention may be used as the oil pan or reservoir of a mechanical apparatus (e.g., an internal combustion and/or electric engine) in which oil is collected and from which the oil is redistributed, preferably continuously, during operation of the apparatus.

25 Claims, 6 Drawing Sheets

OIL PAN

DESCRIPTION OF THE INVENTION

The present invention relates to an oil pan that may be used with an engine, e.g., an internal combustion engine. The oil pan includes a shell of plastic material, and a support structure, having a plurality of perforations, that is fixedly attached to the exterior surfaces and/or the interior surfaces of the plastic shell. The shell is formed by molding plastic material onto the support structure. During the molding process a portion of the plastic material of the shell extends through at least some of the perforations in the support structure, embedding the edges of the perforations therein, and thereby fixedly attaching the support structure to the shell.

In many instances it is desirable to reduce the weight of a mechanical apparatus for reasons including, for example, ease of transport and, in the case of the transportation industries, improved fuel efficiency. In the automotive industry one approach to reducing the overall weight of the vehicle has involved replacing various structural metal components, such as metal body panels, with lighter weight plastic components. More recently, attention in the automotive industry has turned towards replacing metal components of the engine, e.g., the oil pan, with molded plastic. A molded plastic oil pan must be resistant to a wide range of temperatures, e.g., from −40° C. to 150° C., and various fluids, such as engine oil, fuels, salt and water. In addition to providing reduced weight, a molded plastic engine component, such as a molded plastic oil pan, must also provide at least the same degree of mechanical strength and rigidity as the metal component that it is replacing. Unfortunately, molded plastic parts typically have lower strength and rigidity compared to equivalent parts fabricated from metal.

It would be desirable to develop a molded plastic oil pan, e.g., for use as a component in the engine of an automobile, that has reduced weight. It is also desirable that the molded plastic oil pan have, in addition to reduced weight, strength and rigidity that is at least equivalent to that of a metal oil pan.

U.S. Pat. No. 6,131,543 discloses an oil pan for an internal combustion engine that consists of an outer latticed girder structure of a light-weight high-strength material, e.g., of metal, and an inner thin-walled shell of plastic material. The latticed girder structure and the thin-walled shell of the '543 patent are disclosed as forming an integral oil pan structure. The latticed girder structure is disclosed as being placed into a die, into which plastic material is then injected to form the plastic shell in the '543 patent. In FIG. 2 of the '543 patent, the plastic shell and the latticed girder structure are shown as being attached one to the other by means of portions of the latticed girder structure extending through apertures in the plastic shell.

International Patent Publication No. WO 01/83954 A1 discloses an oil pan module for internal combustion engines that is formed by injection molding of a thermoplastic material, e.g., thermoplastic polyamide reinforced with glass fibers. The oil pan of WO 01/83954 A1 is disclosed as being provided with outer and inner reinforcing ribs injection-molded onto it.

U.S. Pat. No. 4,898,261 discloses a plastic oil pan for an internal combustion engine, which includes a plurality of reinforcing walls integrally formed along the sidewalls. The reinforcing walls of the oil pan of the '261 patent are disclosed as increasing the mechanical strength of the oil pan such that it can support the engine when the engine rests on the oil pan during installation or repair procedures.

In accordance with the present invention, there is provided an oil pan comprising:

(a) a shell (11) of plastic material, said shell having interior and exterior surfaces, the interior surfaces of said shell defining a hollow interior (40); and (b) a support structure (14) in abutting relationship with and being fixedly attached to at least one of (i) at least a portion of the exterior surfaces of said shell and (ii) at least a portion of the interior surfaces of said shell, said support structure having a plurality of perforations (20) having edges, wherein said shell is formed by molding of plastic material onto said support structure, a portion of the plastic material of said shell extends through at least some of said perforations of said support structure, the edges of said perforations being embedded in the plastic material extending therethrough, thereby attaching fixedly said support structure (b) to said shell (a).

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about."

BRIEF DESCRIPTION OF THE DRAWINGS

FIG. 4 is a sectional representation of deformed perforation edges of support structure 12 embedded in the plastic material of reinforcing ribs 17 extending there through;

FIG. 5 is a further sectional representation of deformed perforation edges of support structure 12 embedded in the plastic material of reinforcing ribs 17 extending there through;

FIG. 6 is a sectional representation of perforation edges of support structure 12 embedded in the plastic material of reinforcing ribs 17 extending there through;

FIG. 7 is a sectional representation of perforation edges of support structure 12 embedded in the plastic material of side wall 41 of shell 11 extending there through;

In FIGS. 1 through 9, like reference numerals designate the same components and structural features.

DETAILED DESCRIPTION OF THE INVENTION

Figure 1:
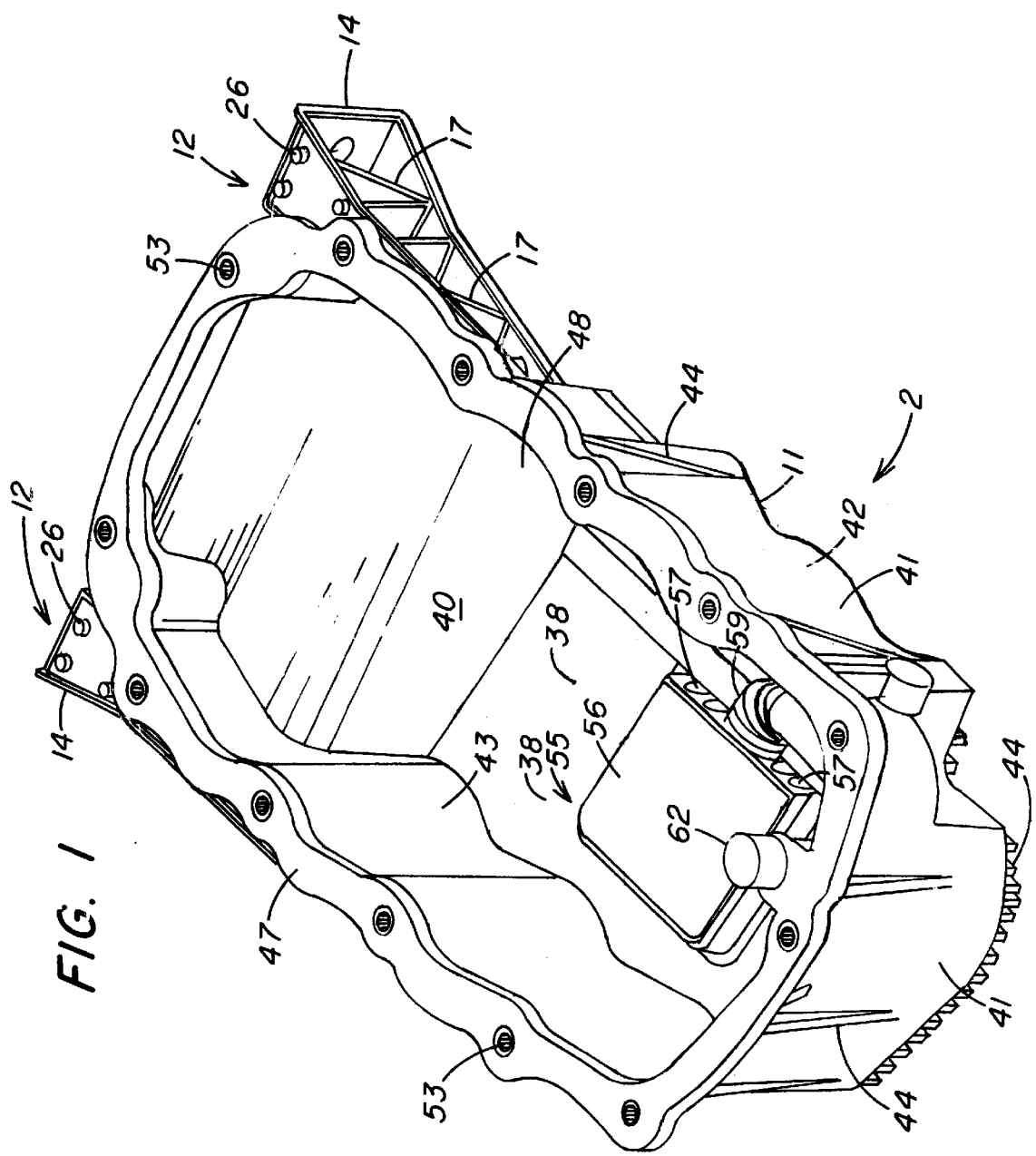
FIG. 1 is a perspective view of an oil pan according to the present invention.
Figure 2:
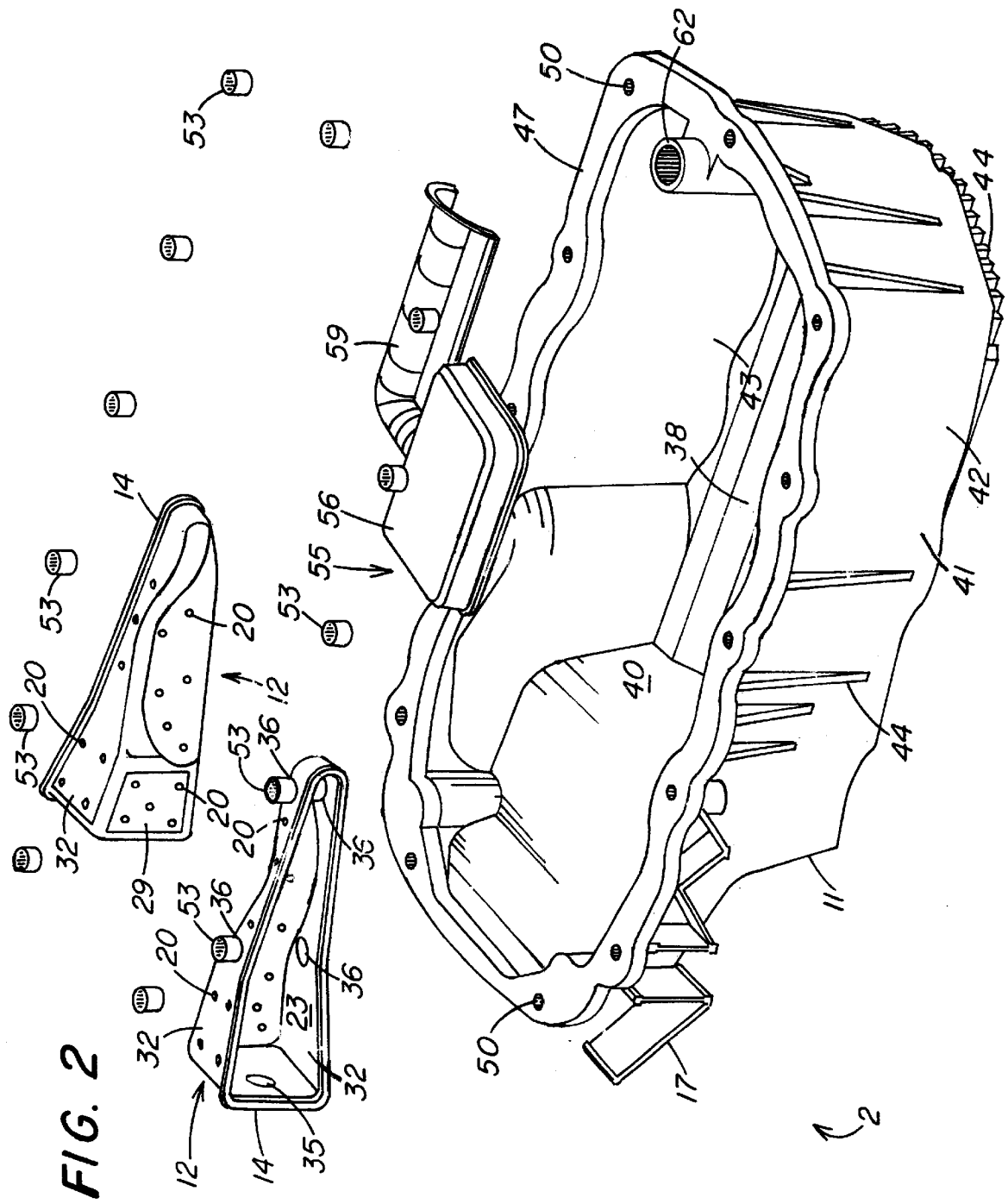
FIG. 2 is a partially exploded perspective view of the oil pan of FIG. 1.
Figure 3:
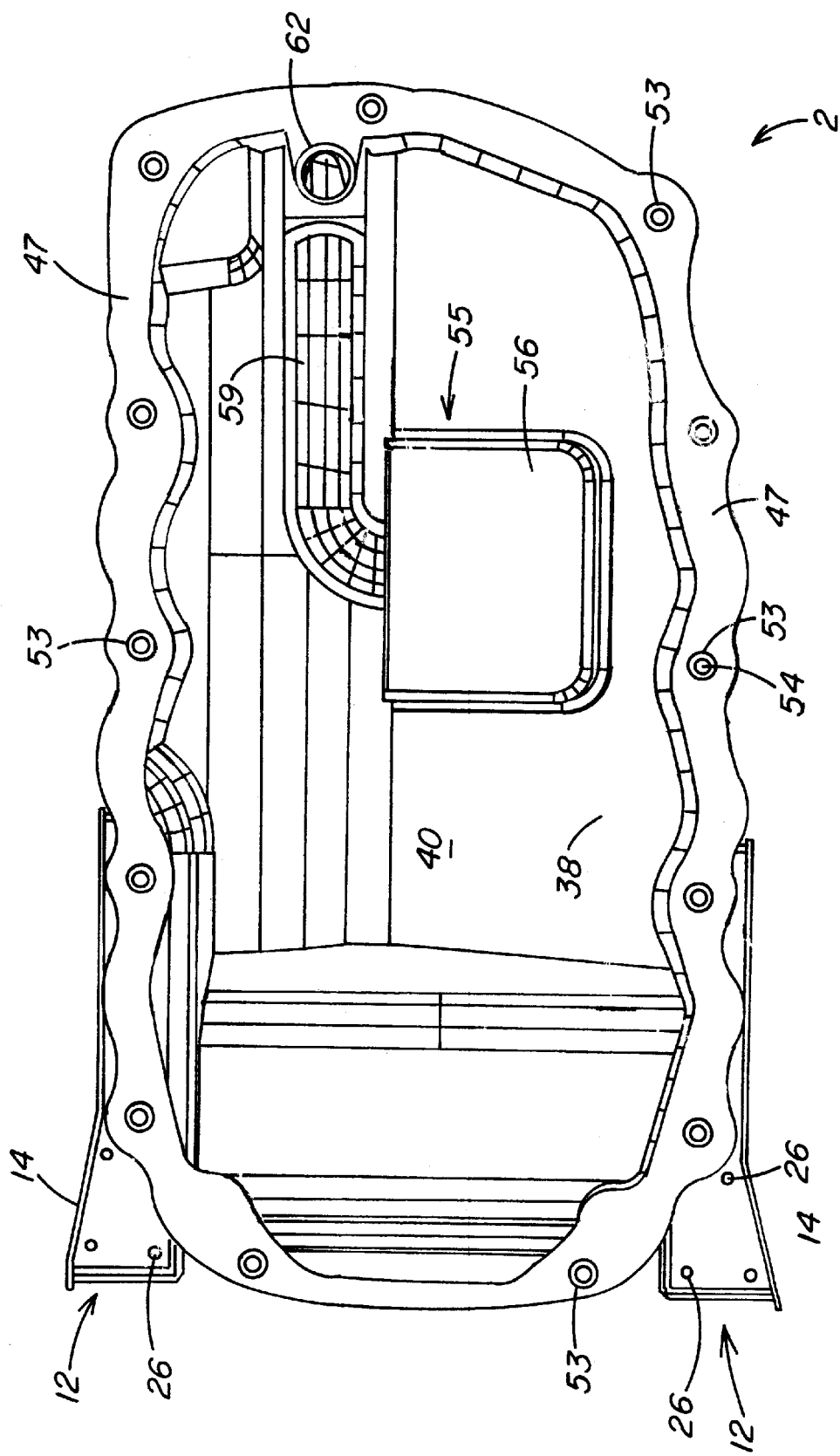
FIG. 3 is a top-down view of the oil pan of FIG. 1.

Referring now to FIGS. 1 through 3 of the drawings, there is shown an oil pan 2 according to the present invention, which includes a shell 11 of plastic material, having side walls 41 and a base 38. The interior surfaces 43 and 39 of side walls 41 and base 38 of shell 11 define the hollow interior 40 of shell 11. Side walls 41 of shell 11 extend substantially upward from base 38. Oil pan 2 has an upper portion 48 that is substantially open.

Side walls 41 of shell 11 have an upper flanged portion 47 that, is preferably continuous with side walls 41, and extends substantially laterally outward from side walls 41. Flange 47 provides a means by which oil pan 2 may be attached to, for example, an engine (not shown). Flange 47 has a plurality of apertures 50, at least some of which have a compression limiter 53 fixedly held therein. Each compression limiter 53 has a cylindrical passage 54 that is sized to receive fasteners, in particular bolts, (not shown) that fasten oil pan 2 to a separate structure, such as an engine (not shown). In the process of attaching oil pan 2 to an engine, the fasteners are tightened, and compression limiters 53 serve to prevent over-compression of flange 47, which could result in cracking or failure of flange 47. Compression limiters 53 may be fabricated from any suitable material, e.g., fiber-reinforced plastics (including thermoset and thermoplastic materials), and metals. Preferably, compression limiters 53 are fabricated from metal, e.g., steel or aluminum. Compression limiters 53 may be inserted fixedly, e.g., by means of adhesives and/or threads (not shown), into apertures 50 after the mold formation of oil pan 2. Preferably, the plastic material of flange 47 is molded onto and around compression limiters 53 during the mold formation of shell 11, as will be described in further detail herein.

Oil pan 2 further includes a support structure 12 that abuts and is fixedly attached to at least a portion of the exterior surfaces 42 of side walls 41 of shell 11. Support structure 12, while depicted as comprising two separate structures, may be a continuous structure (not shown). While depicted as abutting exterior surface 42 of side wall 41, support structure 12 may be alternatively or concurrently located within hollow interior 40 abutting and fixedly attached to at least a portion of the interior surfaces of shell 11, e.g., interior surface 43 of side wall 41 and/or interior surface 39 of base 38. Preferably, support structure 12 abuts and is only fixedly attached to at least a portion of the exterior surfaces of shell 11, e.g., exterior surface 42 of side wall 41.

Support structure 12 has a plurality of perforations 20, at lest some of which serve to fixedly attach support structure 12 to exterior surface 42 of side wall 41 of shell 11. During mold formation of shell 11, a portion of the plastic material of shell 11 extends through at least some of perforations 20, embedding the edges of perforations 20 in the plastic material extending there through, thereby fixedly attaching support structure 12 to shell 11. This will be discussed in further detail herein with reference to FIGS. 7 and 8.

In an embodiment of the present invention, support structure 12 is further fixedly attached to shell 11 by attachment means selected from fasteners, adhesives, snap connections and combinations thereof (not shown). Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives. Snap connections are typically formed by pushing the enlarged rounded head of a cylindrical extension (not shown), extending, for example, outwardly from side wall 41 of shell 11, through a matched flexible perforation in support structure 12 (not shown). The rounded head of the cylindrical extension has a diameter greater than that of the matched perforation, and the cylindrical shaft of the extension has a diameter that is typically equivalent to the diameter of the perforation. Upon pushing the enlarged rounded head of the extension through the matched perforation, the perforation closes back around the shaft of the extension, thus fixedly attaching shell 11 to support structure 12.

Support structure 12 may be fabricated from a material selected from metal, thermoset plastic material, thermoplastic material and combinations thereof. In a preferred embodiment of the present invention, support structure 12 is fabricated from metal. Metals from which support structure 12 may be fabricated include, but are not limited to, ferrous alloys, aluminum alloys and titanium alloys. When fabricated from metal, at least a portion of the surface of the support structure, of the oil pan of the present invention, may be covered with a layer of molded-on plastic (thermoset and/or thermoplastic) material.

As used herein and in the claims the term "thermoset plastic material" means plastic materials having a three dimensional crosslinked network resulting from the formation of covalent bonds between chemically reactive groups, e.g., active hydrogen groups and free isocyanate groups or oxirane groups. Thermoset plastic materials from which support structure 12 may be fabricated include those known to the skilled artisan, e.g., crosslinked polyurethanes, crosslinked polyepoxides and crosslinked polyesters. Of the thermoset plastic materials, crosslinked polyurethanes are preferred. For purposes of illustration, support structure 12 may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) a functional component that forms covalent bonds with the active hydrogen functional component, such as an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., support structure 12, is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which support structure 12 may be fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and mixtures or thermoplastic compositions containing one or more thereof. Of the thermoplastic materials from which support structure 12 may be fabricated, thermoplastic polyamides are preferred. Support structure 12 may be fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., support structure 12, is removed. A preferred thermoplastic material from which support structure 12 may be fabricated is thermoplastic polyamide, e.g., DURETHAN thermoplastic polyamide, commercially available from Bayer Corporation.

The thermoset plastic materials and/or thermoplastic materials from which support structure 12 may be fabricated, may optionally be reinforced with a material selected from glass fibers, carbon fibers, metal fibers, polyamide fibers and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of support structure 12 in a reinforcing amount, e.g., in an amount of from 5 percent by weight to 60 percent by weight, based on the total weight of support structure 12.

The plastic material of shell 11 of oil pan 2 may be selected from thermoset plastic materials, thermoplastic materials and combinations thereof. The thermoset plastic materials from which shell 11 may be fabricated include those described previously herein, e.g., crosslinked polyurethanes. In a preferred embodiment of the present invention, the plastic of shell 11 is a thermoplastic material selected from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitnile-butadiene-styrene and mixtures or thermoplastic compositions containing one or more thereof. A preferred thermoplastic material from which shell 11 may be fabricated is thermoplastic polyamide, e.g., DURETHAN thermoplastic polyamide, commercially available from Bayer Corporation.

Shell 11 of oil pan 2 may optionally be reinforced with a material selected from glass fibers, carbon fibers, metal fibers, polyamide fibers and mixtures thereof. The reinforcing fibers, as described previously herein, may be surface treated, e.g., with sizings, prior to incorporation into the plastic material of the reinforcing ribs. A preferred reinforcing material for use in shell 11 of the present invention are glass fibers. If used, the reinforcement material, e.g., glass fibers, is typically present in the thermoset plastic materials and/or thermoplastic materials of shell 11 in a reinforcing amount, e.g., in an amount of from 5 percent by weight to 60 percent by weight, based on the total weight of shell 11.

The plastic materials of shell 11 and support structure 12 may each independently further contain one or more functional additives other than or in addition to the reinforcing materials. Additives that may be present in the plastic material of the shell and/or the support structure of the oil pan include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the shell and/or support structure in functionally sufficient amounts, e.g., in amounts independently from 0.1 percent by weight to 10 percent by weight, based on the total weight of the plastic material of shell 11 or support structure 12.

Support structure (b) of the oil pan of the present invention may have numerous configurations or shapes. In a preferred embodiment of the present invention, and as depicted in FIGS. 1–3, at least a portion of support structure 12 comprises, (I) a support shell 14 having a base 29 and side walls 32, each having interior surfaces which define a hollow interior 23. At least one of base 29 and side walls 32 have a plurality of perforations 20 having edges. Support structure 12 also includes, (II) a plurality of reinforcing ribs 17 of plastic material located within hollow interior 23 of support shell 14. At least a portion of reinforcing ribs 17 are: (i) in abutting relationship with the interior surfaces of support shell 14; and (ii) fixedly attached to support shell 14. Reinforcing ribs 17 are formed by molding of plastic material onto the interior surfaces of support shell 14, and a portion of the plastic material of reinforcing ribs 17 extends through at least some of perforations 20 of support shell 14, the edges of perforations 20 become embedded in the plastic material extending there through, thereby fixedly attaching reinforcing ribs 17 to support shell 14. Reinforcing ribs 17 may have configurations selected from, but not limited to, X-like configurations, zig-zag configurations, curved or arcuate configurations, parallel configurations and combinations thereof.

In the partially exploded perspective view of oil pan 2 represented in FIG. 2, reinforcing ribs 17 are shown residing next to the exterior of shell 11 without support shell 14 of support structure 12 there-around. This depiction is for purposes of illustration only, as it allows for a clearer view of reinforcing ribs 17 and hollow interior 23 of support shell 14. It is to be understood that reinforcing ribs 17 reside within hollow interior 23 of support shell 14 in the oil pan of the present invention.

Support shell 14 of support structure 12 may be fabricated from metals, thermoset plastic materials, thermoplastic materials and combinations thereof, which may each be selected from those materials recited previously herein with regard to support structure 12. When fabricated from a plastic material, support shell 14 may optionally contain reinforcing materials, e.g., glass fibers, and/or additives, as described previously herein with regard to support structure 12. Preferably, support shell 14 is fabricated from a metal, e.g., steel or aluminum. When fabricated from metal, support shell 14 may optionally further include a layer of molded-on plastic (e.g., thermoset or thermoplastic material), which serves to protect support shell 14 from environmental effects, such as corrosion.

With reference to FIG. 2, support shell 14 includes apertures 35, which serve to reduce the weight of shell 14. Support shell 14 also includes additional apertures 36, which are sized to receive compression fittings 53 there through, and/or to allow the passage of a fastener, e.g., a bolt, into and through a compression fitting 53 or an aperture 50 in flange 47.

The plastic material of reinforcing ribs 17 may be selected from thermoset plastic materials, thermoplastic materials and combinations thereof. The thermoset and thermoplastic materials from which reinforcing ribs 17 may be selected include those recited previously herein with regard to shell 11 and support structure 12. The thermoset plastic materials and/or thermoplastic materials of reinforcing ribs 17 may optionally be reinforced with a material selected from glass fibers, carbon fibers, metal fibers, polyamide fibers and mixtures thereof. The fibers, in particular the glass fibers may be have sizings applied thereto, as discussed previously herein. If used, the reinforcement material, e.g., glass fibers, is typically present in the thermoset plastic materials and/or thermoplastic materials of reinforcing ribs 17 in a reinforcing amount, e.g., in an amount of from 5 percent by weight to 60 percent by weight, based on the total weight of reinforcing ribs 17.

The plastic material of reinforcing ribs 17 may optionally further contain one or more functional additives other than or in addition to the reinforcing materials. Additives, and amounts thereof, that may be present in the plastic material of reinforcing ribs 17 include those additives and amounts as recited previously herein with regard to shell 11 and support structure 12.

Reinforcing ribs 17 may be molded onto the interior surfaces of support shell 14 separately from or concurrently with the mold formation of shell 11. In a preferred embodiment of the present invention, reinforcing ribs 17 are molded onto the interior surfaces of support shell 14 concurrently with the mold formation of shell 11. In a particularly preferred embodiment of the present invention, the plastic material of reinforcing ribs 17 extends through at least some of perforations 20 of support shell 14 and is continuous with the plastic material of shell 11.

With reference to FIGS. 1 and 2, typically, a first mold portion (not shown) is inserted into the hollow interior 23 in abutting relationship with the interior surfaces of support shell 14. The inserted first mold portion and interior surfaces of support shell 14 together define a continuous cavity into which molten thermoplastic material (or the reactive components of a thermoset plastic material), is injected to form reinforcing ribs 17. Optionally, second mold portions (not shown) may be placed in abutting relationship with the exterior of support shell 14 and over some of perforations 20 in support shell 14 to form attachment heads 26.

Figure 4:
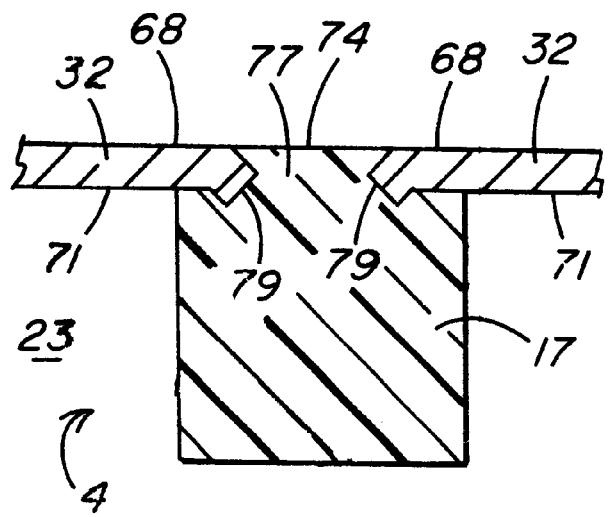
Figure 5:
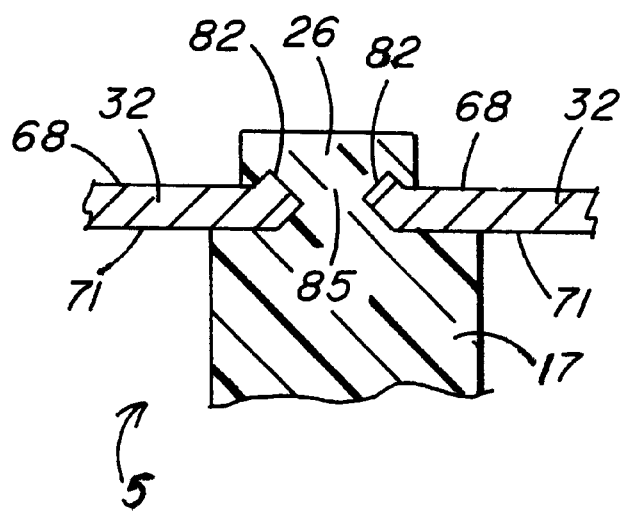
Figure 6:
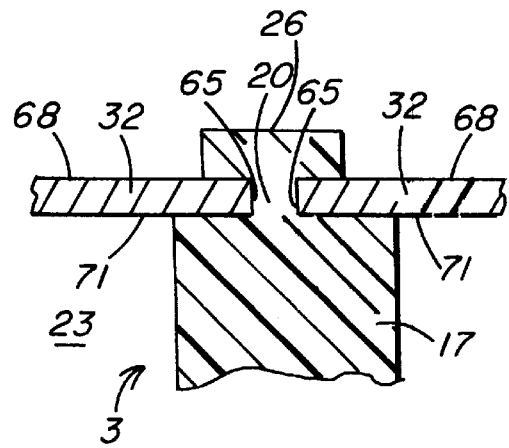

Sectional representations of attachment points or elements by which reinforcing ribs 17 are fixedly attached to support shell 14, which are formed by the passage of injected- or molded-on plastic material passing through perforations 20, are depicted in FIGS. 4, 5 and 6. With reference to FIG. 6, attachment element 3 includes a portion of reinforcing rib 17 that abuts a portion of interior surface 71 of side wall 32 of support shell 14. A portion of the plastic material of reinforcing rib 17 extends through perforation 20 and forms attachment head 26. Edges 65 of perforation 20 are embedded in the plastic material of reinforcing rib 17 extending there through. Attachment head 26 extends out over and abuts a portion of exterior surface 68 of side wall 32 of support shell 14.

In FIGS. 4 and 5, the attachment elements 4 and 5 include perforations having deformed edge portions. With reference to FIG. 4, perforation 77 (not shown in FIGS. 1–3) has deformed edge portions 79 that are embedded in the plastic material of reinforcing rib 17 extending there through. The plastic material of reinforcing rib 17 extending through perforation 77 forms flat attachment head 74 (not shown in FIGS. 1–3), which is substantially flush with exterior surface 68 of side wall 32 of support shell 14. With reference to FIG. 5, perforation 85 (not shown in FIGS. 1–3) has deformed edge portions 82, which are embedded in the plastic material of reinforcing rib 17 that extends there through to form attachment head 26.

Figure 7:
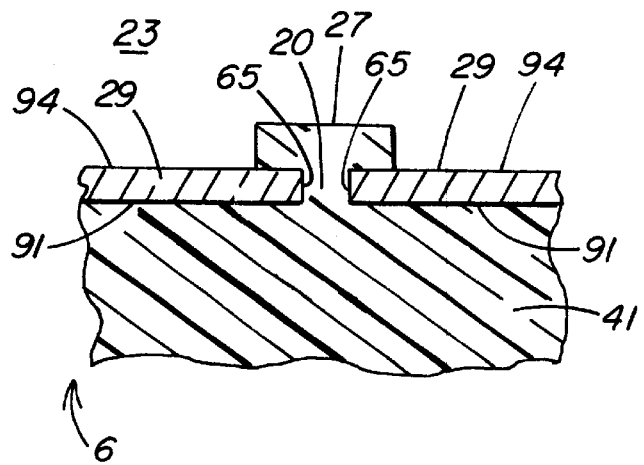
Figure 8:
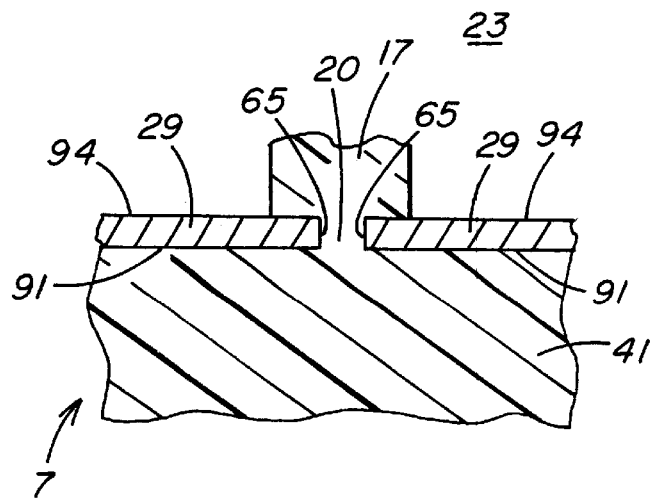
FIG. 8 is a sectional representation of perforation edges of support structure 12 embedded in the plastic material of side wall 41 of shell 11 extending there through, which is continuous with a reinforcing rib 17.

Shell 11 is fixedly attached to support structure 12 by means of plastic material extending through at least some of perforations 20 in support shell 14, which embeds the edges of perforations 20 in the plastic material extending there through. With reference to FIG. 7, attachment element 6 includes a portion of side wall 41 that abuts exterior surface 91 of base 29 of support shell 14. A portion of the plastic material of side wall 41 extends through perforation 20, is continuous with attachment head 27, and embeds edges 65 of perforation 20 in the plastic material extending there through. Attachment head 27 extends out over and abuts interior surface 94 of base 29 of support shell 14. Attachment head 27 (not shown in FIGS. 1–3) may be of any desired shape, e.g., cylindrical, rounded or flat. Perforations 20 of support shell 14 may have any desired configuration, e.g., round, square, rectangular, ellipsoid or slotted. An attachment element 7 that is continuous with the plastic material of shell 11 and reinforcing ribs 17 of support shell 14 is depicted in FIG. 8. With reference to FIG. 8, the plastic material of side wall 41 abuts against exterior surface 91 of base 29 of support shell 14, extends through perforation 20 and is continuous with reinforcing rib 17. Edges 65 of perforation 20 are embedded in the plastic material extending there through. A portion of reinforcing rib 17 in the area around perforation 20 abuts the interior surface 94 of base 29.

Perforations 20 in support shell 14, through which the plastic material of shell 11 extends for the purpose of attaching shell 11 to support shell 14 (e.g., as described with reference to FIGS. 7 and 8 herein), may optionally have deformed edge portions. Such deformed edge portions may be described similarly as those that may be optionally employed in the attachment of reinforcing ribs 17 to support shell 14, as described previously herein with reference to FIGS. 4 and 5.

Oil pan 2 of the present invention is formed by placing support structure 12 into a mold, and molding the plastic (thermoplastic and/or thermoset) material of shell 11 onto support structure 12. In an embodiment of the present invention, the plastic material of shell 11 is molded onto at least a portion of the exterior surfaces of support shell 14, while the plastic material of reinforcing ribs 17 is concurrently molded onto the interior surfaces of support shell 14, as discussed previously herein.

Alternatively, reinforcing ribs 17 may be molded onto the interior surfaces of support shell 14, in a step separate from and either prior to or after the mold formation of shell 11. For example, support shell 14, with reinforcing ribs 17 fixedly held within hollow interior 23, may be placed into a mold, and the plastic material of shell 11 is injected and molded onto and concurrently fixedly attached support shell 14. Further alternatively, reinforcing ribs 17 may be molded onto the interior surfaces of support shell 14 after shell 11 has been molded onto and fixedly attached to support shell 14.

In an embodiment of the present invention, compression limiters 53 are placed in the mold such that they concurrently define apertures 50 and become embedded in the plastic material of shell 11, and more particularly flange 47, that is subsequently injected into the mold. Compression limiters 53 may alternatively be inserted into apertures 50 in flange 47 after the mold formation of shell 11.

The interior and/or exterior surfaces of shell (a) may have plastic reinforcing ribs thereon, in an embodiment of the present invention. The plastic material of the reinforcing ribs is preferably continuous with the plastic material of shell (b), and the ribs are further preferably formed during the mold formation of shell (b). With reference to FIGS. 1 and 2, plastic reinforcing ribs 44 are located on the exterior surface 42 of side walls 41, and on the exterior surface of base 38. Reinforcing ribs 44 provide oil pan 2 with additional rigidity and dimensional stability.

The oil pan of the present invention may be provided with a pick-up module that is fixedly attached to the interior surface of the base of shell (a). The pick-up module comprises a housing having a hollow interior. The housing typically has apertures therein which allow the passage of oil into the hollow interior of the pick-up module. The pick-up module provides a means by which oil may be drawn from the bottom of the oil pan during operation of the mechanical apparatus, e.g., an engine, to which the oil pan is attached, as will be described in further detail herein.

With reference to FIGS. 1–3, oil pan 2 includes a pick-up module 55 that is fixedly attached to interior surface 39 of base 38 within hollow interior 40 of shell 11. Pick-up module 55 includes a housing 56, and a conduit 59 that runs along and is fixedly attached to interior surface 39 of base 38. Conduit 59 provides liquid communication between pick-up module 55 and conduit 62. Conduit 62 provides liquid communication with a pump (not shown) that draws oil up out of oil pan 2 for distribution elsewhere, e.g., over the internal moving parts of an automotive engine. Conduit 62 extends substantially upward from base 38 and is attached to interior surface 43 of side wall 42, within hollow interior 40 of shell 11. Housing 56 of pick-up module 55 has apertures 57 which allow oil to enter the module.

Pick-up module 55, and conduits 59 and 62 may each be fabricated from metals, thermoset plastic materials, thermoplastic materials and combinations thereof. The metals, thermoset plastic materials and thermoplastic materials may each independently be selected from those materials recited previously herein with respect to shell 11 and support structure 12. When fabricated from plastics, e.g., thermoset and/or thermoplastic materials, pick-up module 55, conduit 59 and conduit 62 may each independently contain a filler material selected from those examples and present in amounts as described previously herein with regard to shell 11 and support structure 12. Preferably, pick-up module 55, conduit 59 and conduit 62 are each independently fabricated from a thermoplastic material, e.g., a thermoplastic polyamide.

Pick-up module 55, conduit 59 and conduit 62 may each be fastened to the interior surfaces of shell 11 by fastening means selected from, for example, adhesives, fasteners (e.g., rivets) and plastic welding (when they are fabricated from thermoplastic materials). When fabricated from thermoplastic materials, pick-up module 55, conduit 59 and conduit 62 are each preferably fastened to the interior surfaces of shell 11 by means of plastic welding, e.g., high frequency plastic welding. Alternatively, conduits 59 and 62 may each independently be molded in place concurrently with the mold formation of sell 11.

Oil pan 2 may optionally further include a conduit (not shown), within hollow interior 40 of shell 11, that is sized to provide passage of an oil dip-stick into interior 40. The dip-stick conduit typically extends substantially upward from base 38, and is attached to interior surface 43 of shell 11 (as similarly depicted with regard to conduit 62). The dip-stick conduit may be fabricated from metals, thermoset plastic materials, thermoplastic materials and combinations thereof, as described previously herein with regard to conduit 62. The dip-stick conduit is preferably fabricated from a thermoplastic material, e.g., a thermoplastic polyamide, and may optionally contain reinforcing materials, such as glass fibers. The dip-stick conduit may be attached to interior surface 43 of side wall 41 in a manner similar to that described with regard to conduit 62 previously herein.

In a further embodiment of the present invention, the oil pan includes a wind turbulence deflection panel positioned within the hollow interior of shell (a) between the base and the open upper portion of shell (a). The wind turbulence deflection panel (or windage tray) serves to minimize disturbance of the oil contained within the oil pan from wind turbulence generated by moving parts, e.g., the crank shaft and piston rods of an internal combustion engine (not shown), residing above the oil pan. The wind turbulence deflection panel may be fabricated from metals, thermoset plastic materials and/or thermoplastic materials, as described previously herein with regard to shell 11 and support structure 12.

Figure 9:
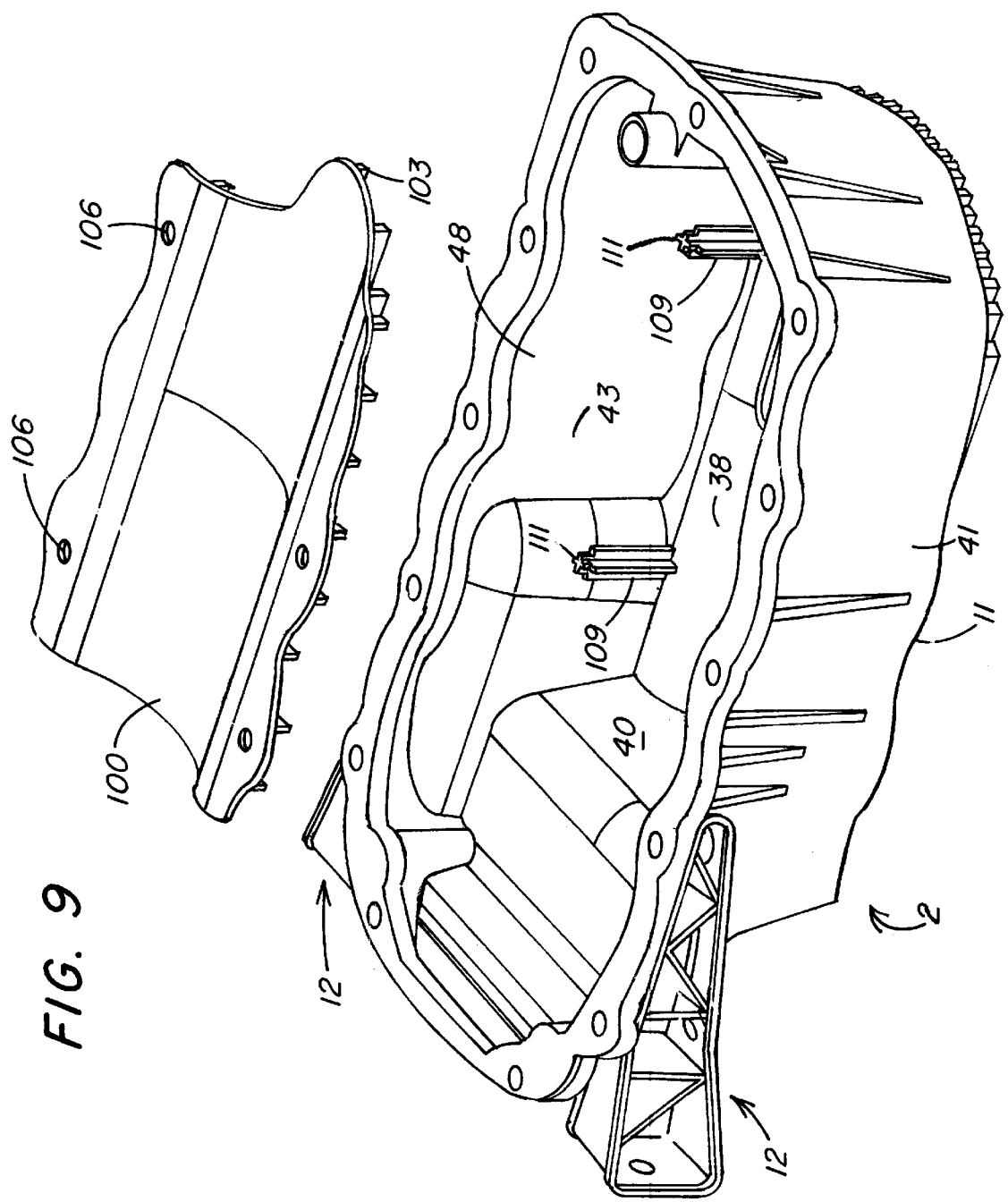
FIG. 9 is a partially exploded perspective view of the oil pan of FIG. 1, which further includes a wind turbulence deflection panel within the hollow interior of the plastic shell.

With reference to FIG. 9, a wind turbulence deflection panel 100 is depicted in a partially exploded perspective view, for purposes of ease of illustration. Panel 100, if present, is located within hollow interior 40 between base 38 and open upper portion 48 of shell 11. Panel 100 has a plurality of molded-on reinforcing ribs 103, which serve to provide panel 100 with increased rigidity and dimensional stability. Panel 100 is supported by means of posts 109 (only two of four of which are visible in FIG. 9), which extend upward from base 38. Posts 109 each have upper portions 111 that are sized to fit within apertures 106 of panel 100. Upper portions 111 may be secured within apertures 106 by means known to the skilled artisan, including for example, adhesives, fasteners, such as screws and rivets and/or plastic welding. Alternatively, wind turbulence deflection panel 100 may be supported within hollow interior 40 of shell 11 by means of a ledge (not shown) on interior surface 43 of side wall 41, to which panel 100 may be fastened by means of adhesives, fasteners, e.g., screws or rivets, and/or plastic welding.

Panel 100 may be fabricated from a material selected from metal, thermoset plastic material, thermoplastic material and combinations thereof (in each case selected from those examples recited previously herein). Preferably, panel 100 and posts 109 are each independently fabricated from thermoplastic material, such as thermoplastic polyamide, e.g., DURETHAN thermoplastic polyamide, commercially available from Bayer Corporation. The thermoplastic material of posts 109 and panel 100 may optionally be reinforced with a material selected from, for example, glass fibers and those reinforcing materials recited previously herein.

The oil pan of the present invention may also further include a reversibly closeable drain plug (not shown) in base 38. Further optionally, the oil pan may include sensors (not shown), e.g., temperature and oil level sensors, and additional conduits or ports (not shown) associated therewith.

The oil pan of the present invention may be used as the oil pan or reservoir of a mechanical apparatus in which a lubricating fluid, such as oil, is collected and from which the lubricating fluid is redistributed, preferably continuously, during operation of the apparatus. Such mechanical apparatae include, but are not limited to, engines, pumps and gear boxes. The oil pan of the present invention is particularly suited for use with engines, including, for example, internal combustion engines, electric engines (including those in which the electricity is generated by fuel cells) and hybrid engines, which are powered by a combination of internal combustion and electricity.

The present invention has been described with reference to specific details of particular embodiments thereof. It is not intended that such details be regarded as limitations upon the scope of the invention except insofar as and to the extent that they are included in the accompanying claims.

What is claimed is:

1. An oil pan comprising:
   (a) a shell of plastic material, said shell having interior and exterior surfaces, the interior surfaces of said shell defining a hollow interior; and
   (b) a support structure in abutting relationship with and being fixedly attached to at least one of (i) at least a portion of the exterior surfaces of said shell and (ii) at least a portion of the interior surfaces of said shell, said support structure having a plurality of perforations having edges,
wherein said shell is formed by molding of plastic material onto said support structure, a portion of the plastic material of said shell extends through at least some of said perforations of said support structure, the edges of said perforations being embedded in the plastic material extending therethrough, thereby attaching fixedly said support structure (b) to said shell (a).

2. The oil pan of claim 1 wherein said support structure is fabricated from a material selected from metal, thermoset plastic material, thermoplastic material and combinations thereof.

3. The oil pan of claim 2 wherein said support structure is fabricated from metal.

4. The oil pan of claim 1 wherein said support structure is further fixedly attached to said shell by attachment means selected from fasteners, adhesives, snap connections and combinations thereof.

5. The oil pan of claim 1 wherein at least some of said perforations of said support structure have deformed edge portions, and said deformed edge portions are embedded in the plastic material of said shell extending therethrough.

6. The oil pan of claim 1 wherein said support structure is in abutting relationship with and fixedly attached to at least a portion of the exterior surface of said shell.

7. The oil pan of claim 1 wherein the plastic material of said shell is selected from thermoset plastic materials, thermoplastic materials and combinations thereof.

8. The oil pan of claim 7 wherein the plastic material of said shell is a thermoplastic material selected from thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene and thermoplastic compositions containing one or more thereof.

9. The oil pan of claim 1 wherein said plastic material of said shell is reinforced with a material selected from glass fibers, carbon fibers, metal fibers, polyamide fibers and mixtures thereof.

10. The oil pan of claim 1 wherein at least a portion of said support structure (b) comprises,
(I) a support shell having a base and side walls each having interior surfaces which define a hollow interior, at least one of said base and side walls having a plurality of perforations having edges; and
(II) a plurality of reinforcing ribs of plastic material located within the hollow interior of said support shell, at least a portion of said reinforcing ribs being in abutting relationship with the interior surfaces of said support shell, and said reinforcing ribs being fixedly attached to said support shell,
wherein said reinforcing ribs are formed by molding of plastic material onto the interior surfaces of said support shell, and a portion of the plastic material of said reinforcing ribs extends through at least some of said perforations of said support shell, the edges of said perforations being embedded in the plastic material extending there through, thereby attaching fixedly said reinforcing ribs to said support shell.

11. The oil pan of claim 10 wherein the plastic material of the reinforcing ribs of said support structure (b) extends through at least some of said perforations of said support shell and is continuous with the plastic of said shell (a).

12. The oil pan of claim 11 wherein said shell (a) and the reinforcing ribs of said support structure (b) are both formed concurrently.

13. The oil pan of claim 10 wherein at least a portion of at least one of the interior surfaces and exterior surfaces of said support shell are covered with a layer of molded-on plastic material.

14. The oil pan of claim 10 wherein the plastic material of shell (a) and the reinforcing ribs of said support structure (b) are each independently selected from thermoset plastic materials, thermoplastic materials and combinations thereof, and said support shell is fabricated from a material selected from metal, thermoset plastic material, thermoplastic material and combinations thereof.

15. The oil pan of claim 10 wherein at least one of the plastic material of shell (a) and the plastic material of the reinforcing ribs of said support structure (b) are each independently reinforced with a material selected from glass fibers, carbon fibers, metal fibers, polyamide fibers and mixtures thereof.

16. The oil pan of claim 1 wherein said shell (a) has a base and side walls extending substantially upward from said base, said shell having an upper portion that is open.

17. The oil pan of claim 16 wherein said side walls of said shell (a) have an upper flanged portion of plastic material extending substantially laterally outward from said side walls, said upper flanged portion providing a means by which said oil pan is attached to an engine, said upper flanged portion being continuous with said side walls.

18. The oil pan of claim 17 wherein said flanged portion has a plurality of apertures, at least some of said apertures having compression limiters fixedly held therein, the plastic material of said upper flanged portions of said side walls being molded onto the compression limiters during the formation of said shell.

19. The oil pan of claim 1 wherein at least one of the interior and exterior surfaces of said shell (a) have plastic reinforcing ribs thereon, said reinforcing ribs being continuous with the plastic material of said shell, and said reinforcing ribs being formed during the mold formation of said shell.

20. The oil pan of claim 16 further comprising an oil pick-up module fixedly attached to the interior surface of the base of said shell.

21. The oil pan of claim 20 further comprising a conduit within the hollow interior of said shell, said conduit being connected to and providing liquid communication with said oil pick-up module, said conduit extending substantially upward from said base and being attached to the interior surface of a side wall of said shell.

22. The oil pan of claim 16 further comprising a conduit within the hollow interior of said shell (a), said conduit extending substantially upward from said base and being attached to the interior surface of a side wall of said shell (a), said conduit being sized to provide passage of an oil dip-stick into the hollow interior of said shell (a).

23. The oil pan of claim 16 further comprising a wind turbulence deflection panel positioned within the hollow interior of said shell (a) between the base and the open upper portion of said shell (a).

24. The oil pan of claim 1 wherein said oil pan is part of an engine.

25. The oil pan of claim 24 wherein said engine is an internal combustion engine.

* * * * *